G. C. CLARK.
MOLDING APPARATUS.
APPLICATION FILED DEC. 2, 1915.

1,210,421.

Patented Jan. 2, 1917.
4 SHEETS—SHEET 1.

George C. Clark
INVENTOR

By George J. Ottsch
ATTORNEY

G. C. CLARK.
MOLDING APPARATUS.
APPLICATION FILED DEC. 2, 1915.

1,210,421.

Patented Jan. 2, 1917.
4 SHEETS—SHEET 2.

INVENTOR
George C. Clark.
BY
George J. Oltsch
ATTORNEY

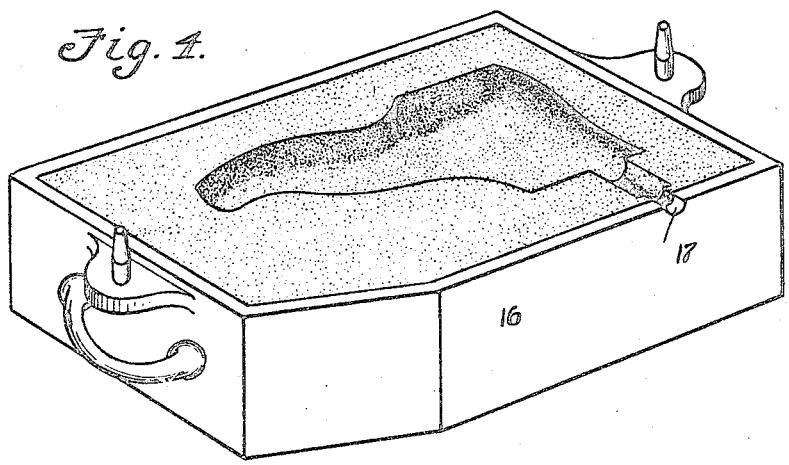
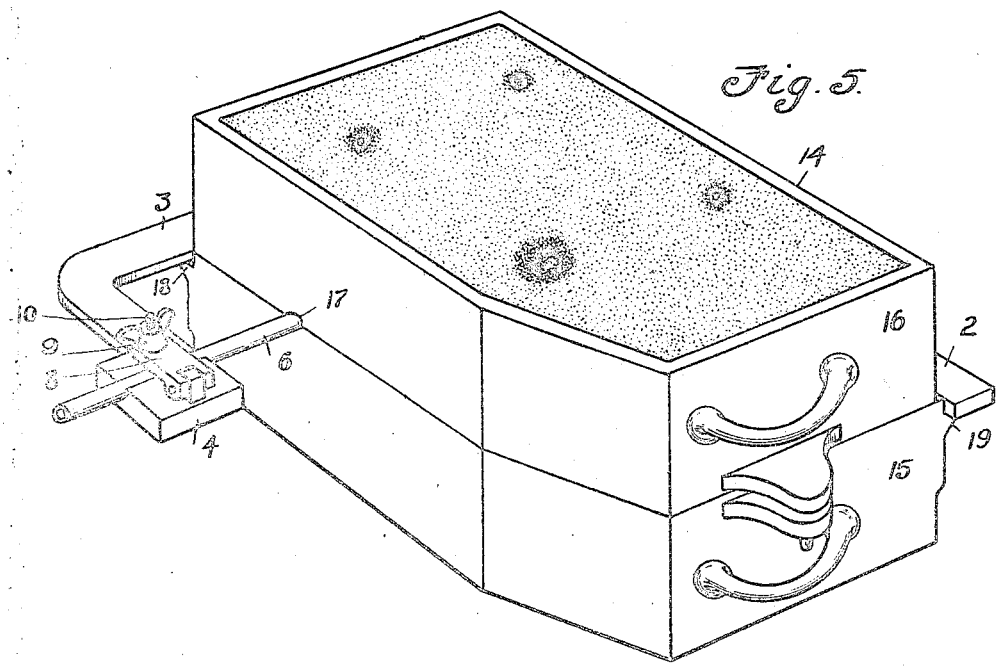

G. C. CLARK.
MOLDING APPARATUS.
APPLICATION FILED DEC. 2, 1915.

1,210,421.

Patented Jan. 2, 1917.
4 SHEETS—SHEET 4.

INVENTOR
George C. Clark
BY
George J. Ottsch
ATTORNEY

UNITED STATES PATENT OFFICE.

GEORGE C. CLARK, OF MISHAWAKA, INDIANA.

MOLDING APPARATUS.

1,210,421.  Specification of Letters Patent.  Patented Jan. 2, 1917.

Application filed December 2, 1915. Serial No. 64,771.

*To all whom it may concern:*

Be it known that I, GEORGE C. CLARK, a citizen of the United States, residing at Mishawaka, in the county of St. Joseph and State of Indiana, have invented certain new and useful Improvements in Molding Apparatus, of which the following is a specification.

The invention relates to an improvement in molding apparatus of that type designed for use in molding hollow articles, and is particularly directed to mold core supporting and carrying means, which together with the mold proper, is so formed as to permit the absolutely accurate and precise positioning of the core within the mold.

In molding hollow articles, as heretofore carried out, material difficulty has been experienced in properly positioning the core within the mold, to insure an even distribution of the metal, this difficulty having been previously overcome, to some extent at least, by providing a plurality of arbors or supports for the core to engage the mold drag, and even under these circumstances considerable time, labor and experience, was required in properly positioning the core.

The present invention aims to overcome these difficulties in providing an element, such as a carrier, from which the core is supported by a single arbor, such carrier and the drag member of the two-part flask, being coöperatively formed, so that in the application of the carrier to the drag, the relative positions are the same in all repetitions of the molding operation. By this means the absolute accuracy of the position of the core within the mold is insured. Furthermore the improved carrier permits the use of a single arbor for supporting the core from the carrier, resulting in a single opening in the completed article, and avoiding the usual plugging heretofore necessary. Again, the carrier is adapted in a measure to counter-balance the weight of the core and thus assist in maintaining its position.

Figure 1:
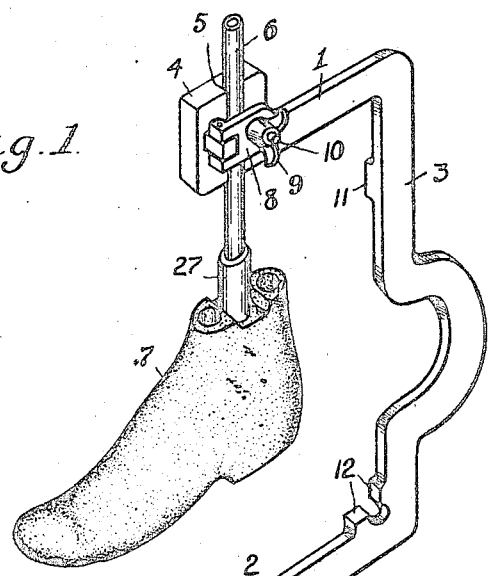
Figure 8:
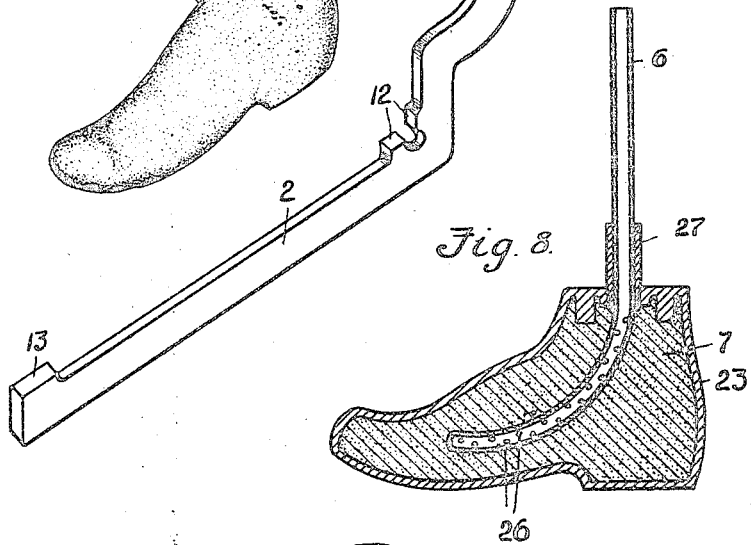
Figure 9:
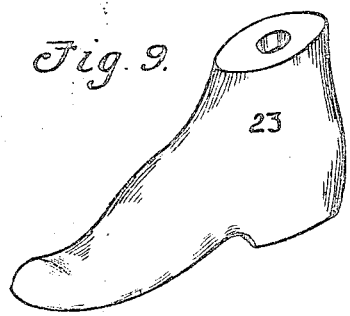
Figure 2:
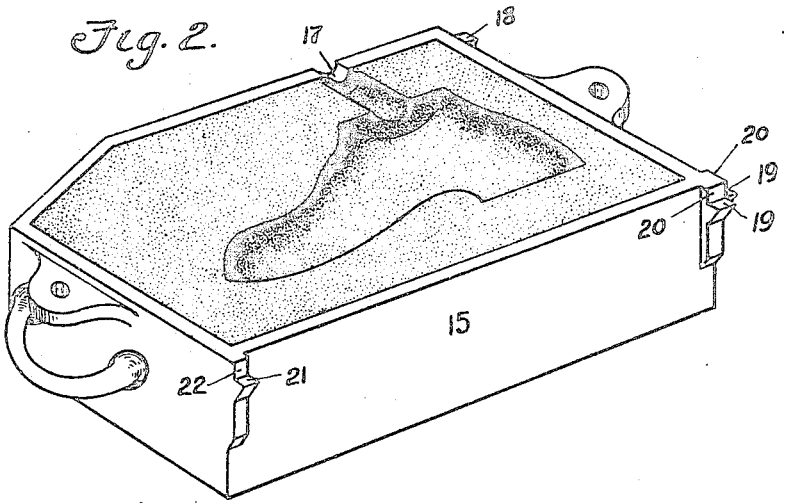
Figure 3:
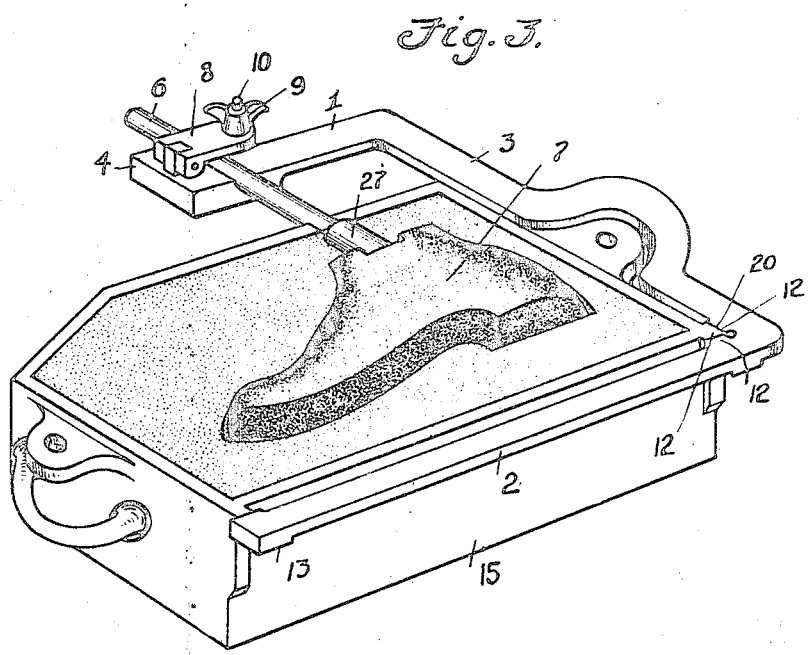
Figure 7:
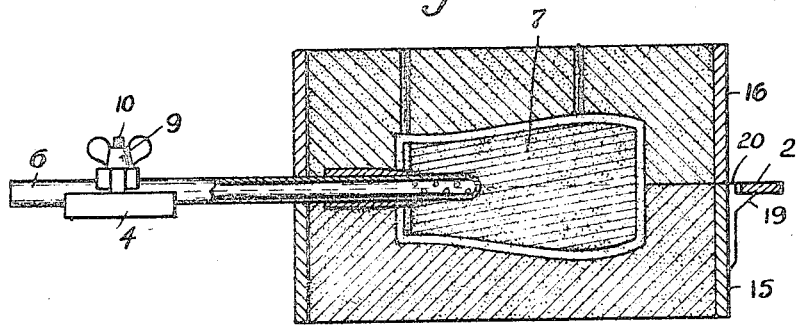
Figure 6:
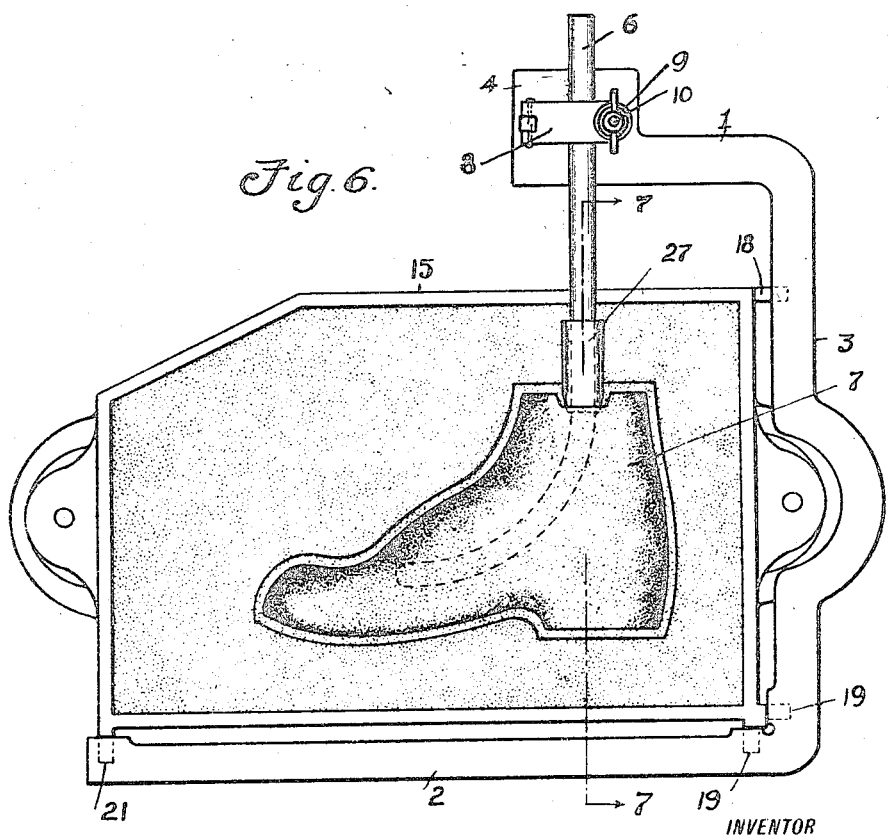

The invention in the preferred form of details will be described in the following specification, reference being had particularly to the accompanying drawings, in which:

Figure 1 is a perspective view of the improved carrier with the supported core; Fig. 2 is a perspective view of the drag member of the two-part molding flask; Fig. 3 is a similar view with the carrier and core in applied position; Fig. 4 is a perspective view of the cope of the flask; Fig. 5 is a perspective view of the mold complete; Fig. 6 is a plan view of the drag and applied carrier and core, illustrating particularly the spacing of the core with respect to the mold wall; Fig. 7 is a section on line 7—7 of Fig. 6; Fig. 8 is a vertical sectional view through the molded article showing the core and arbor in place; Fig. 9 is a perspective view of the completed article.

The improved carrier, with which the present invention is particularly concerned, comprises a rigid, comparatively narrow metallic strip bent to form spaced parallel arms 1 and 2 and a connecting member 3 joining the arms at one end. The arm 1 is of materially less length than the arm 2 and is terminally formed with an enlargement 4, which is in turn formed with a recess 5 extending across the enlargement at right angles to the arm 1, and of a size to receive the arbor 6 on which the core 7 is supported. A clamp plate 8 has hinged connection with the enlargement 4, and is adapted to overlie the recess 5, being thereby brought to bear upon the arbor, when the latter is in place. The clamp plate is held in clamping relation by a thumb nut 9 engaging a threaded pin 10 over which the clamp plate is passed in operation.

At certain appropriate points the carrier, considered as a unit, is formed with what may be termed bearing points; as for example on the connecting member 3 adjacent its connection with the arm 1, as at 11, at the juncture of the connecting member 3 and arm 2, as at 12, and at the free terminal of the arm 2 as at 13. The bearing point 11 is offset from one flat face of the carrier; the bearing point 12, in effect two spaced bearing surfaces disposed at right angles to each other, are offset from the edge of the carrier, as well as from the flat surface, while the bearing point 13 is offset from the edge as well as from the flat surface. All these bearing points are carefully machined to present absolutely accurate bearing surfaces.

The mold comprises the usual two-part flask 14 including a drag 15 and a cope 16. The pattern is outlined in the material of the mold in any usual or preferred manner, so that said mold pattern is partly in the drag and partly in the cope, as usual. The drag, formed in one edge with the usual arbor receiving recess 17 is, on the end wall adjacent said recess, formed with a projection or abutment 18, is further formed at the juncture of the said end wall and meeting side wall with two abutments 19 and with bearing surfaces 20 rising above the abutments; and is further formed at the remote end of the said side wall with an abutment 21 and a bearing surface 22 rising therefrom. The respective abutments 18, 19 and 21, and the bearing surfaces 20 and 22 are carefully machined and finished so as to accurately coöperate with and receive the respective bearing points 11, 12 and 13 of the carrier. The relative dispositions of the abutments is such that when the carrier is in position on the drag, the upper surface of the carrier is in direct alinement with the extreme upper edge of the drag, while the coöperation of the edge bearing surfaces 12 and 13 of the carrier with the bearing surfaces 20 and 22 of the drag, insure an absolutely accurate angular disposition of the carrier with respect to the drag. From this coöperative formation it will be apparent that the carrier is, through the means described, held in absolutely uniform relation to the drag in all applications of said carrier to the drag for the casting operation, and hence assuming the position of the core to be the same with relation to the carrier for each casting operation, it is at once apparent that the position of the core within the mold will be absolutely the same under all molding repetitions.

It will be apparent, from the co-pending application filed December 2, 1915, Serial No. 64,770, that the carrier is also adapted for use with the molding machine for the core, in which provision is made for insuring that the position of the core and carrier will be the same, in each re-molding of the core, so long as such similarity is desired, and that therefore assuming that the relative positions of the core and carrier may be maintained absolutely uniform the advantageous results of the carrier in its coöperation with the mold will be apparent.

In the present application, largely for the purpose of illustration, I have shown the article to be molded in the form of a hollow metallic last, as at 23, Fig. 9. Under these conditions the core 7 will be correspondingly shaped. An arbor 6 is used, comprising a length of pipe, preferably curved in that portion to be inserted within the core to facilitate its supporting function. The arbor is of course open at the upper end and perforated at 26 in that portion within the core to provide desired pressure relief in the molding operation.

With the improved carrier, the single arbor is seated in the recess 5 and clamped by the plate 8, this operation being concluded prior to the molding of the core.

The arbor is also provided with a sleeve 27 adapted to form an opening in the completed article from which, after removal of the sleeve the arbor and material of the core may be readily withdrawn. The carrier is thus adapted to support the core, directly through the arbor, and there is no necessity for additional support of the core for the molding operation. This is particularly resultant from the fact that the coöperation of the carrier and drag insure absolute uniformity in the subsequent applications of the carrier to the drag, and furthermore the enlarged section 4 of the carrier acts as a counter-balance for the weight of the core, the edge of the drag serving to some extent as a fulcrum.

The present invention is not concerned with any core molding operation, nor with the adjustment during such operation as will properly position the core with respect to the carrier, such forming the subject matter of the co-pending application hereinbefore referred to. The salient feature of the present invention is the provision of a core carrier, which when associated with the core is, by reason of its specific formation, and the coöperating formation of the drag member of the flask, adapted to be so disposed with relation to the drag as to absolutely insure the same position of the succeeding cores in the re-application of the carrier to the drag for succeeding casting operations. The carrier is further adapted and constructed with a view to permitting the use of a single arbor or core support, so that but a single element enters the mold proper.

What is claimed is:

1. The combination with a drag member of a flask having spaced bearing points formed on the exterior walls thereof, of a core carrier comprising relatively angular sections adapted to engage said bearing points for the support and uniform positioning of the carrier on the drag member.

2. The combination with a flask member, of a carrier wholly disposed without and adapted to engage and register with said member exteriorly thereof, and a core arbor supported by the carrier adapted to extend into the flask member, whereby the application of the carrier in registration with the flask member will automatically dispose the core in the proper mold forming position.

3. The combination with a drag member of a flask formed on adjacent walls with supporting abutments, a carrier adapted to be positioned on said abutments to support the core in molding position.

4. The combination with a drag member of a flask formed with supporting abutments and bearing surfaces on a plurality of its walls, of a carrier for the core provided with bearing points to coöperate with the abutments and bearing surfaces of the drag to accurately position the carrier with respect to the drag.

5. A core carrier including an approximately U-shaped frame, means carried thereby to engage the core arbor, and offset bearing points formed on a plurality of sections of the frame.

6. A core carrier comprising an approximately flat strip of U-form, said strip being formed at spaced intervals with bearing points.

7. A core carrier comprising an approximately flat strip of U-form, said strip being formed at spaced intervals with bearing points, certain of the points projecting beyond the flat surface of the strip and certain of the points projecting both beyond the flat and edge surfaces of the strip.

8. A core carrier comprising an approximately U-shaped flat strip having one arm of greater length than the other, the terminal of the short arm being enlarged, and core arbor engaging means carried by said enlargement.

9. A core carrier comprising an approximately U-shaped flat strip having one arm of greater length than the other, the terminal of the short arm being enlarged and formed with a core arbor receiving recess, and clamping means overlying said recess.

10. The combination with a drag member of a flask, of an arbor adapted to support a core on one end thereof, an arbor carrier comprising relatively angular sections adapted to engage the drag member to support and uniformly position the carrier with respect to said member, and means for attaching the opposite end of the arbor to the carrier to support the core in the proper mold forming position.

11. The combination with a drag member of a flask, of an arbor adapted to support a core on one end thereof, an arbor carrier adapted to engage the drag member to support and uniformly position the same with respect to said member, and means for attaching the opposite end of the arbor to the carrier, the upper edge of the drag member serving as a bearing point for the arbor, and the carrier serving as a counterweight for the arbor and core.

12. The combination with a flask, of a carrier supported by the flask, and a core arbor supported by the carrier, the carrier serving as a counterweight for the core arbor.

13. The combination with a flask, of a carrier supported by the flask, and a core arbor supported by the carrier and flask, whereby the flask will serve as a bearing point and the carrier as a counterweight for the arbor.

14. A core carrier including a frame having angularly related sections, the terminal of one of the sections being formed to receive and connect a core supporting arbor.

15. A core carrier including a frame having angularly related sections, spaced points on the frame sections being formed to provide particular bearing surfaces, and core arbor supporting means carried by one of said sections.

In testimony whereof I affix my signature in presence of two witnesses.

GEORGE C. CLARK.

Witnesses:
 JOHN F. DUCEY,
 F. HENRY WURZER.